US008003253B2

(12) United States Patent
Sato et al.

(10) Patent No.: US 8,003,253 B2
(45) Date of Patent: Aug. 23, 2011

(54) NON-AQUEOUS ELECTROLYTE SECONDARY BATTERY

(75) Inventors: Toshitada Sato, Osaka (JP); Yasuhiko Bito, Osaka (JP); Masaya Ugaji, Osaka (JP)

(73) Assignee: Panasonic Corporation, Osaka (JP)

( * ) Notice: Subject to any disclaimer, the term of this patent is extended or adjusted under 35 U.S.C. 154(b) by 892 days.

(21) Appl. No.: 11/451,304

(22) Filed: Jun. 13, 2006

(65) Prior Publication Data

US 2006/0286458 A1    Dec. 21, 2006

(30) Foreign Application Priority Data

Jun. 17, 2005 (JP) .................. 2005-177246
Mar. 17, 2006 (JP) .................. 2006-074970

(51) Int. Cl.
  $H01M\ 4/13$ (2010.01)
  $H01M\ 4/134$ (2010.01)
  $H01M\ 4/48$ (2010.01)
  $H01M\ 10/0525$ (2010.01)
  $H01M\ 4/38$ (2006.01)
(52) U.S. Cl. ................................. 429/218.1
(58) Field of Classification Search .......... 429/60, 429/218.1, 231.95
See application file for complete search history.

(56) References Cited

U.S. PATENT DOCUMENTS

| 6,387,340 | B1 * | 5/2002 | Na et al. ................. 423/301 |
| 6,413,672 | B1 * | 7/2002 | Suzuki et al. ............. 429/231.8 |
| 6,500,399 | B1 * | 12/2002 | Joubert .................. 423/301 |
| 6,890,685 | B2 * | 5/2005 | Yamamoto et al. ........ 429/231.95 |
| 2004/0265691 | A1 * | 12/2004 | Imoto .................... 429/221 |
| 2005/0079421 | A1 * | 4/2005 | Konishiike et al. ...... 429/231.95 |
| 2005/0214646 | A1 * | 9/2005 | Kubota .................. 429/231.95 |

FOREIGN PATENT DOCUMENTS

| EP | 0 820 110 A2 | 1/1998 |
| EP | 1 054 462 A1 | 11/2000 |
| JP | 06298506 A * | 10/1994 |
| JP | 10-116631 | 5/1998 |
| JP | 10-154529 | 6/1998 |
| JP | 11-233155 A | 8/1999 |

(Continued)

OTHER PUBLICATIONS

Xu, Kang, et al., "LiBOB as Addictive in $LiPF_6$-Based Lithium Ion Electrolytes," Electrochemical and Solid-State Letters, 2005, p. A365-A368, vol. 8, No. 7, The Electrochemical Society.

(Continued)

Primary Examiner — Gregg Cantelmo
(74) Attorney, Agent, or Firm — McDermott Will & Emery LLP

(57) ABSTRACT

A non-aqueous electrolyte secondary battery including: a positive electrode; a negative electrode, and a non-aqueous electrolyte. The negative electrode includes a negative electrode active material that includes at least Si. The non-aqueous electrolyte includes lithium hexafluorophosphate as a main supporting electrolyte and has an acid content of not less than 50 ppm and not more than 200 ppm. The negative electrode has a potential of not less than 0.6 V and not more than 1.5 V relative to a Li electrode at an end-of-discharge voltage of the battery. The battery is prevented from suffering degradation of storage characteristics caused by the dissolution reaction of Si from the negative electrode during charging and the precipitation reaction of the dissolved Si.

3 Claims, 1 Drawing Sheet

FOREIGN PATENT DOCUMENTS

| | | |
|---|---|---|
| JP | 2002-175835 | 6/2002 |
| JP | 2002-203600 | 7/2002 |
| JP | 2005-079057 | 3/2005 |

OTHER PUBLICATIONS

Partial Translation of Japanese Laid-Open Patent Publication No. 10-116631, May 1998.

Partial Translation of Japanese Laid-Open Patent Publication No. 2005-079057, Mar. 2005.

English translation of the Notification of Reasons for Refusal of the corresponding Korean application (Application No. 10-2006-0053852).

English translation of the First Notification of Reasons for Refusal of the corresponding Chinese application (Application No. 2006-10093747.1).

English translation of the Second Notification of Reasons for Refusal of the corresponding Chinese application (Application No. 2006-10093747.1).

* cited by examiner

NON-AQUEOUS ELECTROLYTE SECONDARY BATTERY

FIELD OF THE INVENTION

The present invention relates to non-aqueous electrolyte secondary batteries, and, more particularly, to a non-aqueous electrolyte secondary battery including a preferable negative electrode and a non-aqueous electrolyte.

BACKGROUND OF THE INVENTION

An extensive research and development has been conducted on the use of lithium metal, which is capable of realizing high voltage and high energy density, as the negative electrode for non-aqueous electrolyte secondary batteries. This has lead to commercialization of lithium ion batteries that use a graphite material, which is capable of reversibly absorbing and desorbing lithium and excellent in cycle life and safety, in the negative electrode.

However, the useful capacity of batteries using a graphite material-based negative electrode is approximately 350 mAh/g, which is very close to the theoretical capacity (372 mAh/g) of a graphite material. Thus, as long as a graphite material is used in the negative electrode, a dramatic increase in capacity is not feasible. Meanwhile, the functions of portable appliances are becoming increasingly sophisticated, and the required capacity of non-aqueous electrolyte secondary batteries serving as the energy source of such appliances tends to increase commensurately. Therefore, in order to achieve higher capacities, negative electrode materials having capacities higher than that of graphite are necessary.

As materials offering higher capacities, alloy materials containing silicon (Si) and alloy materials containing tin are currently receiving attention. These metal elements are capable of electrochemically absorbing and desorbing lithium ions and capable of charge/discharge with capacities that are significantly higher than that of a graphite material. For example, it is known that silicon has a theoretical discharge capacity of 4199 mAh/g, which is 11 times as high as that of graphite.

Therefore, research is now underway on batteries that use a silicon-containing negative electrode active material, together with conventional lithium secondary battery components such as a lithium cobaltate positive electrode and a non-aqueous electrolyte composed of a 1 mol/L lithium hexafluorophosphate and a mixed solution of ethylene carbonate and ethyl methyl carbonate. However, if such batteries are stored at high temperatures, particularly in a discharged state, they are highly susceptible to deterioration. Therefore, they have a problem of battery malfunction after storage.

In order to avoid this problem, it is preferable to minimize the discharge potential of the negative electrode. For example, Japanese Laid-Open Patent Publication No. Hei 11-233155 (Patent Document 1) proposes minimizing the capacity loss due to charge/discharge cycles by using SiO as the negative electrode active material and controlling the end-of-discharge potential of the negative electrode at 0.6 V or lower relative to a Li electrode.

However, if the discharge potential is limited as in Patent Document 1, since the average discharge potential of SiO is 0.4 V to 0.5 V relative to a Li electrode, only about a half of the capacity SiO inherently has is utilized, so that the inherent high capacity of SiO is sacrificed.

BRIEF SUMMARY OF THE INVENTION

An object of the present invention is to provide a non-aqueous electrolyte secondary battery that can make full use of the inherent high capacity of a Si-based negative electrode material, without causing deterioration in storage characteristics and charge/discharge cycle characteristics.

The present invention relates to a non-aqueous electrolyte secondary battery including: a positive electrode capable of electrochemically absorbing and desorbing Li; a negative electrode including a negative electrode active material that comprises at least Si; and a non-aqueous electrolyte.

The non-aqueous electrolyte includes lithium hexafluorophosphate as a lithium salt that is a main supporting electrolyte, and the non-aqueous electrolyte has an acid content of not less than 50 ppm and not more than 200 ppm. The negative electrode has a potential of not less than 0.6 V and not more than 1.5 V relative to a Li electrode at an end-of-discharge voltage of the battery.

The present invention has been completed based on the following research.

A conventional battery with the above-mentioned problem was disassembled and the potential of the negative electrode was measured relative to a Li electrode (Li/Li$^+$). As a result, it was found to be 1.8 V vs Li/Li$^+$. Also, the amount of Si dissolved in the electrolyte was calculated, and it was found that approximately 1/100 of the Si contained in the negative electrode was dissolved in the non-aqueous electrolyte. Further, the coating film formed on the surface of the negative electrode active material by the side reaction with the non-aqueous electrolyte was analyzed, and a large amount of a Si-containing compound was detected together with Li-containing inorganic and organic compounds.

This reaction was carefully examined, and it is presumed that the following reaction occurs when the Si contained in the negative electrode active material dissolves in the electrolyte.

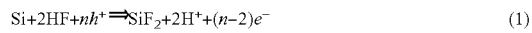

$$Si + 2HF + nh^+ \rightleftharpoons SiF_2 + 2H^+ + (n-2)e^- \quad (1)$$

(h$^+$ represents a hole)

When the battery is in a discharged state (i.e., when electrons are pulled out of the negative electrode) and HF is present in the non-aqueous electrolyte, the Si forms SiF$_2$ by the reaction represented by the formula (1) and dissolves in the non-aqueous electrolyte. The SiF$_2$ precipitates as a Si compound on the negative electrode surface or other locations in the battery by the following chemical reaction.

$$SiF_2 + 4HF \rightleftharpoons H_2SiF_6 + H_2 \quad (2)$$

It is believed that these reactions occur when the Si contained in the negative electrode active material dissolves in the non-aqueous electrolyte and precipitates as a Si compound.

In order to suppress the dissolution of the Si contained in the negative electrode active material into the electrolyte during charging and the precipitation of the Si as a Si compound on the negative electrode surface, the present inventors have found that the following conditions are effective:

(1) the non-aqueous electrolyte contains lithium hexafluorophosphate as a main lithium salt.

(2) the non-aqueous electrolyte has an acid content of not less than 50 ppm and not more than 200 ppm.

(3) the potential of the negative electrode is not less than 0.6 V and not more than 1.5 V relative to a Li electrode at an end-of-discharge voltage of the battery, i.e., when the battery voltage is at the end-of-discharge voltage or when the battery is discharged to the end-of-discharge voltage.

The negative electrode active material is preferably Si, a Si alloy, or a Si compound.

The Si compound is preferably an oxide represented by $SiO_x$ where $0<x<2$. The total amount of Fe, Ni, Co, Cu and Cr contained in the Si alloy is preferably 1000 ppm or less.

The negative electrode preferably includes a negative electrode current collector and a thin film of the negative electrode active material that is deposited on the negative electrode current collector.

The non-aqueous electrolyte preferably contains not more than 5% by weight of a bis[1,2-oxalate(2-)-O,O']borate ion.

The present invention can make full use of the inherent high capacity of a Si-based negative electrode material. Also, the present invention can solve the above-mentioned problems, i.e., it can control the dissolution reaction of Si in a discharged state and the film-forming reaction due to the dissolved Si. Accordingly, it is possible to provide a non-aqueous electrolyte secondary battery that is excellent in storage characteristics and charge/discharge characteristics.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
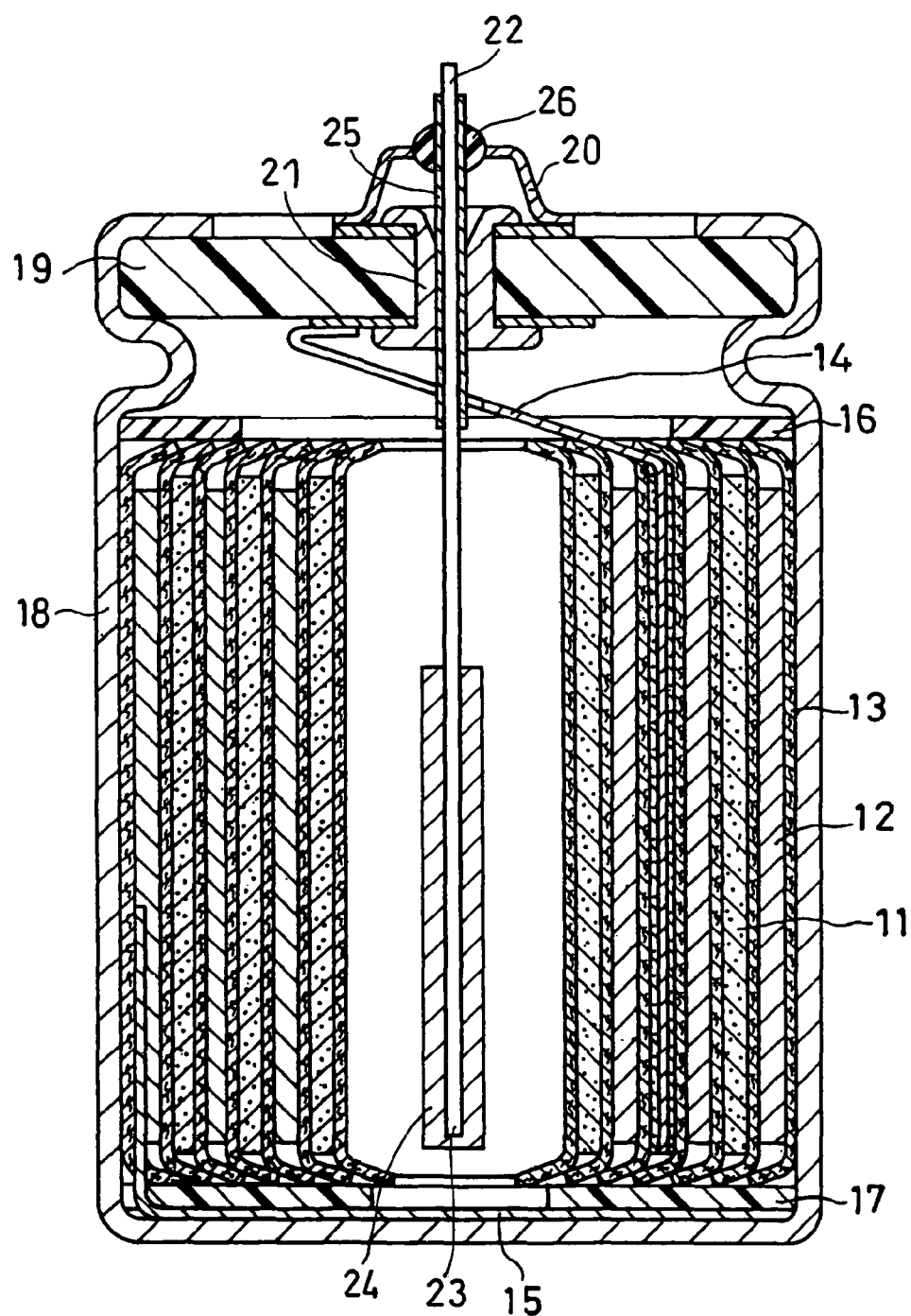
FIG. 1 is a schematic longitudinal sectional view of a cylindrical lithium ion secondary battery used in an Example of the present invention.

A negative electrode active material capable of electrochemically absorbing and desorbing Li in accordance with the present invention comprises Si. More specifically, the negative electrode active material is Si, a Si alloy, or a Si compound.

The Si alloy preferably has a Si content of more than 50% by weight. The particularly preferable alloy has a Si content of 75% by weight or more. Such alloys are capable of providing high capacities.

The preferable element contained as an impurity in the Si alloy, Si, or Si compound is Ti, Zr or Sn. Further, the inclusion of P or Sb is preferable. Also, the element that exerts an adverse effect when contained therein is Fe, Ni, Co, Cu or Cr, and the total content of Fe, Ni, Co, Cu and Cr is desirably 1000 ppm or less.

The reason is as follows. Ti, Zr, Sn, P or Sb has a valence of 4 or more just like Si. Thus, when Ti, Zr, Sn, P or Sb is alloyed with Si, holes are unlikely to be formed and free electrons (carriers) are produced, so that these elements produce the preferable effect of increasing electronic conductivity. On the other hand, Fe, Ni, Co, Cu or Cr has a valence of 3 or 2 when incorporated in Si. Thus, when it is alloyed with Si, holes are formed in the alloy, so that the dissolution of Si is facilitated during charge.

The Si compound is preferably $SiO_x$ where $0<x<2$. Particularly when $0<x\leq1$, a negative electrode with a high capacity and a long life is realized. The value x represents the ratio of oxygen to the whole negative electrode active material, and can be determined, for example, by oxygen quantification according to a combustion method. This compound $SiO_x$ may locally have a plurality of compositions, or may have a completely uniform composition. One example of the former compound is $SiO_{0.8}$ in which the outermost layer is $SiO_{0.3}$, the intermediate layer is $SiO_{0.7}$, and the lowermost layer is $SiO_{0.9}$.

The Si-based negative electrode active materials as described above are preferably amorphous or low-crystalline. As used herein, "low-crystalline" refers to a crystal grain size of 50 nm or less. The crystal grain size can be calculated from the half width of the most intense peak in an X-ray diffraction pattern by Scherrer formula.

Also, "amorphous" as used herein refers to having a broad peak in the range of $2\theta=15$ to $40°$ in an X-ray diffraction pattern. In the case of a crystalline negative electrode active material, when it expands due to insertion of Li, the particles or thin film of the negative electrode active material is cracked or destroyed. As a result, the negative electrode active material has an increased reaction area and therefore more chances to come into contact with hydrofluoric acid contained in the non-aqueous electrolyte. Accordingly, the dissolution reaction of Si and the precipitation reaction of the Si compound are promoted. On the other hand, in the case of an amorphous or low-crystalline negative electrode active material, it expands due to insertion of Li, but since it is divided by minute grain boundaries (approximately several nm to 50 nm), the expansion stress is dispersed and eased by the respective grain boundaries. As a result, the cracking or breakage of the active material particles or film is unlikely to occur.

In a preferable mode of the negative electrode including the Si-based negative electrode active material, an electrode mixture layer containing at least particles of the negative electrode active material and a binder is carried on a negative electrode current collector. In another preferable mode, the negative electrode active material is provided on a negative electrode current collector in the form of a deposited film or sintered film by a physical or chemical process. In a particularly preferable mode, a deposited film of the negative electrode active material is formed on a negative electrode current collector by a physical process.

The particles of the negative electrode active material used in the electrode mixture layer preferably have a size of not less than 0.1 μm and not more than 50 μm. The binder may be any material if it can bind the negative electrode current collector and negative electrode active material together and is electrochemically inactive in the operating potential range of the battery. Suitable exemplary binders include, styrene-butylene copolymer rubber, polyacrylic acid, polyethylene, polyurethane, polymethyl methacrylate, polyvinylidene fluoride, polytetrafluoroethylene, carboxymethyl cellulose, and methyl cellulose. They may be used singly or in combination. With respect to the amount of the binder, a larger amount is more preferable in terms of maintaining the structure of the electrode mixture layer, but a smaller amount is more preferable in terms of heightening battery capacity and improving discharge characteristics. It is preferred that the electrode mixture layer further contain a conductive agent mainly composed of carbon, such as graphite, carbon black or carbon nanotubes. These conductive agents are preferably in contact with the negative electrode active material.

Preferable physical processes for forming the deposited film are sputtering, vapor deposition, thermal spraying, and shot peening, and preferable chemical processes are CVD and plating. Among these processes for forming the deposited film, vapor deposition is particularly preferable, since vapor deposition is capable of forming a thin film at a high speed and suited for forming a deposited film of not less than several μm and not more than 50 μm. The deposited film is not necessarily a flat and smooth film, and the deposited active material may be in the form of pillars or islands. The sintered film is desirably provided by forming the electrode mixture layer containing the negative electrode active material and subjecting it to a sintering treatment by means of heating or plasma.

When the deposited film or sintered film of the negative electrode active material is composed singly of Si, the thickness is preferably not less than 1 µm and not more than 20 µm. When the film is thinner than 1 µm, the volume of the current collector relative to the battery is large, thereby making it difficult to produce a battery with a high capacity. On the other hand, if the film is thicker than 20 µm, the stress due to the expansion of the active material is significantly exerted on the whole current collector or negative electrode, thereby causing the electrode to be wrinkled or eventually destroyed. Hence, a thickness of more than 20 µm is inappropriate. When the deposited film or sintered film of the negative electrode active material is composed of a Si alloy or Si compound, the thickness of the film is preferably not less than 3 µm and not more than 50 µm for the same reasons as those described above.

Each of the above-mentioned film thicknesses is the thickness before the insertion of lithium and almost equal to the film thickness in a discharged state (a state of the battery when it is discharged to an end-of-discharge voltage).

The electrode mixture layer containing the negative electrode active material preferably has a thickness of not less than 10 µm and not more than 100 µm. If the electrode mixture layer is thicker than 100 µm, it is difficult for a non-aqueous electrolyte to penetrate into the vicinity of the current collector, so that the negative electrode active material cannot be fully utilized. Also, when it is thinner than 10 µm, the volume of the current collector relative to the electrode is too large. As a result, the battery capacity deteriorates, which is not preferable.

The non-aqueous electrolyte comprises a non-aqueous solvent and lithium hexafluorophosphate that is dissolved in the non-aqueous solvent and serves as the main supporting electrolyte. Any non-aqueous solvent may be used without particular limitation if it is used as the electrolyte for non-aqueous electrolyte secondary batteries. Commonly used examples are solvent mixtures of a cyclic carbonate, such as ethylene carbonate or propylene carbonate, and a chain carbonte, such as dimethyl carbonate, diethyl carbonate, or ethyl methyl carbonate. Further, it is also possible to mix γ-butyrolactone, dimethoxyethane or the like into the non-aqueous solvent. The concentration of lithium hexafluorophosphate is desirably not less than 0.5 mol/L and not more than 2 mol/L. A non-aqueous electrolyte using lithium hexafluorophosphate as the main supporting electrolyte provides good battery characteristics, compared with the use of other lithium salts. Further, in addition to the lithium hexafluorophosphate, it is also possible to add a small amount of another lithium salt, for example, lithium tetrafluoroborate or an imidelithium salt.

The total acid content of the non-aqueous electrolyte is not less than 50 ppm and not more than 200 ppm. As described above, during discharge, the negative electrode causes dissolution reaction of Si in the presence of HF. In the present invention, by controlling the acid content and the negative electrode potential, a part of the negative electrode active material surface is modified such that the charge/discharge reaction proceeds easily.

The outermost surface layer of the Si-based negative electrode active material is usually covered with $SiO_2$. Since this $SiO_2$ is electrochemically inactive with respect to Li and electrically nonconductive, it interferes with the charge/discharge reaction. Therefore, by dissolving the $SiO_2$ layer and a part of the nearby Si (in this case, Si means the Si element, the Si phase contained in a Si alloy, or the $SiO_x$ (0<x<2) phase) to increase the reaction area of the negative electrode active material, it is possible to promote the the electrochemical reaction. If the acid content of the non-aqueous electrolyte is less than 50 ppm, the $SiO_2$ layer cannot be sufficiently dissolved and the active material surface cannot be sufficiently damaged, which is not effective. On the other hand, if the acid content is more than 200 ppm, the negative electrode active material Si is excessively dissolved, which is inappropriate.

The main acid contained in the non-aqueous electrolyte is hydrofluoric acid, but other acids may be contained as long as the total acid content is within the above-mentioned range. The acid content of the non-aqueous electrolyte is reduced by reducing the amount of water originally (at the time of production) contained in the non-aqueous electrolyte. Besides, the acid content is effectively reduced by reducing the amount of water contained in the positive electrode, negative electrode, separator, and other battery components.

Further, the non-aqueous electrolyte preferably contains not more than 5% by weight of a bis[1,2-oxalate(2-)-O,O'] borate (hereinafter referred to as BOB) ion. The BOB ion is an anion with the following structural formula and has the action of neutralizing the acids contained in the electrolyte. Hence, the BOB ion significantly weakens the active acids in the electrolyte, thereby preventing excessive dissolution reaction of Si and the precipitation reaction of the dissolved Si.

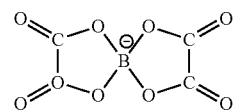

In the present invention, at an end-of-discharge voltage of the battery, the negative electrode potential is 0.6 to 1.5 V vs $Li/Li^+$. If the discharge is terminated at a potential higher than this range, dissolution of Si may occur even if the above conditions are satisfied. The particularly preferable negative electrode potential at an end-of-discharge voltage of the battery is 0.6 to 0.9 V vs $Li/Li^+$. As used herein, "end-of-discharge voltage" refers to the lowest discharge voltage capable of safe discharge. In the present invention, the end-of-discharge voltage is set in the range of not less than 5 V and not more than 3.0 V, and preferably in the range of 2.0 V to 2.5 V. Also, even in at least in such voltage range, it is preferred that reversible Li (Li capable of electrochemical action) be present as well as irreversible Li (Li havening no potential due to side reaction or the like, such as Li oxides) after the battery is fully discharged to the end of charge/discharge cycles. In this case, in the event of overdischarge, the reversible Li can discharge, and it is thus possible to ensure battery safety. With respect to the amount of reversible Li, a small amount is effective, but it is desirably not less than 3% and not more than 30% of the discharge capacity (total discharge capacity) in the range of 0 to 3.0 V vs $Li/Li^+$. When the amount of reversible Li is less than 3%, Li is easily depleted in the event of overdischarge, so that it is difficult to ensure safety. On the other hand, if the amount exceeds 30%, the capacity of Li for the operating voltage range of the battery is small, so that a high capacity cannot be obtained.

Also, such control of the negative electrode discharge potential produced a significant effect in suppressing the dissolution of Si particularly when a Si oxide was used, especially in the form of a thin film. The reason is probably as follows. First, a Si oxide particularly has a SiO$_2$ layer. Second, a Si oxide in the form of a thin film has a small reaction area and therefore has a significantly higher capacity per reaction area than a particulate Si oxide, so that it is more likely to cause side reaction.

In order to bring the end-of-discharge potential of the negative electrode in the above-mentioned range and provide a high capacity, it is preferable to add Li that provides suitable irreversible capacity of the negative electrode. Methods for adding Li include a method of attaching a Li metal foil on the negative electrode surface and a method of forming a thin Li film on the negative electrode surface by vapor deposition or the like. The amount of Li added to the surface may be determined as appropriate depending on the irreversible capacity of the negative electrode itself.

When the negative electrode of the present invention comprises a current collector made of metal foil and a negative electrode mixture layer carried on each side of the current collector, the current collector is desirably a copper foil or copper alloy foil. The copper alloy foil preferably has a copper content of 90% by weight or more. In terms of improving the strength and flexibility of the current collector, it is effective that the copper foil or copper alloy foil contains an element such as P, Ag, or Cr.

The thickness of the current collector is preferably not less than 6 μm and not more than 40 μm. If the current collector is thinner than 6 μm, it is difficult to handle. In addition, the current collector is unlikely to have the necessary strength, so that it may be broken or wrinkled due to expansion and contraction of the electrode mixture layer. On the other hand, if the current collector is thicker than 40 μm, the volume ratio of the current collector to the battery is large and thus disadvantageous in capacity depending on the kind of the battery. Also, if the current collector is thick, it is difficult to handle, for example, difficult to bend.

The non-aqueous electrolyte secondary battery of the present invention includes the above-described negative electrode, a positive electrode capable of electrochemically absorbing and desorbing Li, and the non-aqueous electrolyte.

The positive electrode may be any electrode that is used as the positive electrode of non-aqueous electrolyte secondary batteries and there is no particular limitation. The positive electrode may be produced by conventional methods. For example, a positive electrode can be obtained by mixing a positive electrode active material, a conductive agent such as carbon black, and a binder such as polyvinylidene fluoride in a liquid phase to form a paste, applying this paste onto a positive electrode current collector made of, for example, Al, drying it, and rolling it.

The positive electrode active material may be any material that is used as the positive electrode active material of non-aqueous electrolyte secondary batteries and there is no particular limitation. However, lithium-containing transition metal compounds are preferable.

Exemplary lithium-containing transition metal compounds include, but are not limited to, LiCoO$_2$, LiNiO$_2$, LiMn$_2$O$_4$, and LiMnO$_2$. Such compounds whose transition metal elements are replaced with a different metal element are also used preferably. Such examples include LiCO$_{1-x}$Mg$_x$O$_2$, LiNi$_{1-y}$CO$_y$O$_2$, LiNi$_{1-y-x}$CO$_y$Mn$_z$O$_2$ where 0<x<1, 0<y<1, and z is an integer.

In order to prevent an internal short-circuit between the positive electrode and the negative electrode, a separator is provided between the two electrodes. The separator material may be any material as long as it allows the non-aqueous electrolyte to pass through to a suitable extent and prevents a contact between the positive electrode and the negative electrode. A microporous film made of polyethylene, polypropylene, or the like is commonly used in non-aqueous electrolyte secondary batteries, and the thickness thereof is normally not less than 10 μm and not more than 30 μm.

The present invention is applicable to non-aqueous electrolyte secondary batteries of various shapes, such as cylindrical, flat, coin, and prismatic shapes, and the shape of the batteries is not particularly limited. The present invention is applicable to batteries of various sealing types, including batteries whose power generating elements such as electrodes and electrolyte are housed in a metal battery can or a laminate film case, and the sealing type of the batteries is not particularly limited.

The present invention is hereinafter described more specifically by ways of Examples and Comparative Example. The following Examples, however, are merely illustrative of preferable modes of the present invention and are not to be construed as limiting in any way the present invention.

EXAMPLE 1

In this example, negative electrodes and cylindrical batteries were produced in the following manner and evaluated for the cycle life and discharge capacity.
(1) Production of Negative Electrode
Negative Electrode (i)

A graphite crucible with Si metal (purity 99.999%, Furuuchi Chemical Corporation, ingot) placed therein and an electron gun were set in a vapor deposition device. An electrolytic copper foil (thickness 20 μm, available from Furukawa Circuit Foil Co., Ltd.) serving as a current collector sheet was introduced into this vapor deposition device at a constant speed (5 μm/min) from a roll, to deposit Si onto the surface of the copper foil. The deposition conditions were set at an acceleration voltage of −8 kV and a current of 150 mA. The degree of vacuum in the device was set at $3 \times 10^{-5}$ Torr in performing the following vapor depositions unless otherwise specified.

After the deposition of one side of the current collector sheet was completed, vapor deposition of the other side (undeposited side) was also performed in the same manner, to form a thin film of active material on each side. These thin films were subjected to an X-ray diffraction analysis and found to have a broad peak attributable to amorphous Si at 2θ=15-40°. This result showed that the active material Si was amorphous. The total thickness of the negative electrode was approximately 30 to 36 μm, and the thickness of the thin film per one side of the current collector was approximately 5 μm.

The negative electrode sheet was again introduced into the vapor deposition device and Li was deposited on both sides of the negative electrode from a Li metal target (available from Honjo Chemical Corporation) by means of resistance heating. The amount of deposition was adjusted by changing the transportation speed at which the negative electrode sheet was introduced into the vapor deposition device from the roll. In this way, a given amount of Li was added to the surfaces of the negative electrode sheet. For example, in the negative electrode (i) used in a battery 1 that will be described later, the transportation speed of the negative electrode sheet was 5 cm/min and the thickness of deposited Li was approximately 5 μm. By varying the amount of Li added, the irreversible capacity of the negative electrode was supplemented to control the negative electrode potential at the end of discharge. Likewise, a negative electrode (ii), a negative electrode (iii), and a negative electrode (iv), which will be described below, were also supplemented with Li.

After the formation of the Si thin films, the negative electrode (i) was dried in a vacuum at 110° C. for 15 hours and then stored at room temperature in a dry atmosphere with a dew point of −60° C. or less. Also, after the supplementation of Li, the negative electrode (i) was also stored in a dry atmosphere with a dew point of −60° C. or less, to remove and control the water content in the electrodes.

Negative Electrode (ii)

Ti metal (purity 99.9%, 100 to 150 μm, available from Japan Pure Chemical Co., Ltd.) and Si metal (purity 99.99%, 100 to 150 μm, available from Kanto Chemical Co., Inc.) were weighed and mixed together in a weight ratio of Ti:Si=9.2:90.8.

3.5 kg of this powder mixture was placed into a vibration mill (FV-20, available from Chuo Kakohki Industries, Ltd.), and stainless steel balls (diameter 2 cm) were placed therein such that they occupied 70% of the internal volume of the mill. After the container was evacuated, Ar (purity 99.999%, available from Nippon Sanso Corporation) was introduced therein to provide 1 atmospheric pressure. The frequency of the mill was set to 720 Hz. Under these conditions, mechanical alloying was performed for 80 hours.

The Ti—Si alloy obtained in the above operation was collected and examined for particle size distribution. As a result, it was found to have a wide particle size distribution of 0.5 μm to 80 μm. This Ti—Si alloy was classified with a sieve (10 μm under), to obtain an alloy material (hereinafter referred to as an alloy "a") with a maximum particle size of 8 μm and a mean particle size of 5 μm.

This alloy "a" was subjected to an ICP spectrometry to detect impurities, and it was found that Fe was contained at 500 ppm, Ni 30 ppm, and Cr 60 ppm. The other transition metal elements were below the detection limit. The total content of these elements was 590 ppm.

The alloy "a" was subjected to an X-ray diffraction analysis, and the result showed that the alloy was microcrystalline. Also, the size of crystal grains (crystallites) was calculated from the half width of the most intense peak by Scherrer formula, and the grain size was found to be 18 nm. Further, from the peaks of the X-ray diffraction pattern and observation with a transmission electron microscope, it was presumed that the alloy "a" had a Si single phase (A phase) and a $TiSi_2$ phase (B phase). By assuming that the alloy "a" has only these 2 phases, the ratio between the Si single phase and the $TiSi_2$ phase was calculated, and it was found that Si:$TiSi_2$=80:20 (weight ratio).

The alloy "a" was observed with a transmission electron microscope (TEM). It was found that the alloy "a" had an amorphous region, the Si single phase including crystal grains (crystallites) with a size of approximately 10 nm, and the $TiSi_2$ phase including crystal grains (crystallites) with a size of approximately 15 to 20 nm.

The alloy "a" and graphite were mixed together in a weight ratio of 25:75. 100 parts by weight of this mixture was mixed with 2 parts by weight of acetylene black (trade name DENKA BLACK, available from Denki Kagaku Kogyo K.K.) serving as a conductive agent and 8 parts by weight of polyacrylic acid (molecular weight approximately 150000, available from Wako Pure Chemical Industries, Ltd.) serving as a binder. This mixture was sufficiently kneaded while adding pure water, to obtain a negative electrode mixture paste. The graphite used was flake graphite (KS-44) with a mean particle size of 20 μm available from Timcal Ltd.

This negative electrode mixture paste was applied onto both sides of a current collector made of a 10-μm-thick electrolytic copper foil (available from Furukawa Circuit Foil Co., Ltd.), dried, and rolled. As a result, a negative electrode sheet comprising the current collector and a negative electrode mixture layer carried on each side thereof was obtained. The density of the negative electrode mixture layer was 1.3 g/cm$^3$, and the porosity of the negative electrode mixture layer was 40%. This negative electrode sheet was dried in a vacuum at 190° C. for 12 hours and stored in a dry atmosphere with a dew point of −60° C. or less.

Next, a given size of a Li metal foil (thickness 50 μm, available from Honjo Chemical Corporation) was attached to the surfaces of the negative electrode sheet, to supplement the irreversible capacity with a suitable amount of Li. For example, in the negative electrode (ii) used in a battery 7 that will be described later, Li was attached so as to cover approximately ¼ of the negative electrode area.

After the supplementation of Li, the negative electrode sheet was stored in a dry atmosphere with a dew point of −60° C. or less in the same manner, to remove and control the water content in the electrodes.

Negative Electrode (iii)

SiO (purity 99.9%, mean particle size 20 μm, maximum particle size 45 μm, available from Sumitomo Titanium Corporation) was used as the negative electrode active material. The Sio was mixed with graphite and acetylene black such that SiO:graphite:acetylene black=45:52:3 (weight ratio), in order to compensate for the low electronic conductivity of the SiO. This mixture was mixed with 5 parts by weight of polyvinylidene fluoride (available from Kureha Chemical Industry Co., Ltd.) and then sufficiently kneaded with N-methyl-2-pyrrolidone, to obtain a negative electrode mixture paste. The graphite used was graphite (KS4) with a mean particle size of 3 μm available from Timcal Ltd.

The negative electrode mixture paste was applied onto both sides of a current collector made of a 10-μm-thick electrolytic copper foil (available from Furukawa Circuit Foil Co., Ltd.), dried, and rolled in the same manner as in the negative electrode (ii). As a result, a negative electrode sheet comprising the current collector and a negative electrode mixture layer carried on each side thereof was obtained. The density of the negative electrode mixture layer was 1.0 g/cm$^3$, and the porosity of the negative electrode mixture layer was 55%.

This negative electrode sheet was dried in a vacuum at 80° C. for 24 hours and stored in a dry atmosphere with a dew point of −60° C. or less.

In the same manner as in the negative electrode (ii), a given size of a Li metal foil (thickness 50 μm, available from Honjo Chemical Corporation) was attached to this negative electrode to supplement a suitable amount of Li. For example, in the negative electrode (iii) used in a battery 13 that will be described later, Li was attached so as to cover approximately ½ of the negative electrode area.

The negative electrode sheet with Li supplemented was stored at room temperature in a dry atmosphere with a dew point of −60° C. or less, to remove and control the water content in the electrodes.

Negative Electrode (iv)

In the same manner as in the negative electrode (i), a current collector sheet comprising an electrolytic copper foil was introduced into a vapor deposition device equipped with a graphite crucible with Si metal placed therein and an electron beam gun, and Si was deposited on the surfaces thereof. However, in this example, oxygen gas with a purity of 99.7% (available from Nippon Sanso Corporation) was supplied to the surfaces of the current collector sheet in the deposition device. The oxygen gas was supplied from an oxygen cylinder through a mass flow controller and a gas pipe with a nozzle at the end thereof into the vapor deposition device at a flow rate of 80 sccm. The deposition conditions were set at an acceleration voltage of −8 kV, a current of 150 mA, and a vacuum degree of $1.5 \times 10^{-3}$ Torr.

In this way, a thin film of active material was formed on each side of the current collector sheet. The total thickness of the negative electrode, i.e., the total thickness of the current collector sheet and the thin films on both sides thereof was approximately 42 to 45 μm, and the thickness of the thin film per one side was approximately 10 to 12 μm. The amount of oxygen in the thin films was measured by a combustion method, and it was found to be $SiO_{0.4}$. Also, the thin films were subjected to an X-ray diffraction analysis. As a result, a crystalline peak attributed to Cu of the current collector sheet was observed and the films were found to have a broad peak at $2\theta = 15\text{-}40°$. This result showed that the active material was amorphous.

The negative electrode sheet thus produced was again introduced into the vapor deposition device and Li was deposited on both sides of the negative electrode by heating the Li metal target. For example, the thickness of deposited Li was approximately 8 μm per one side when the transportation speed of the negative electrode was set to 3 μm/min.

(2) Preparation of Positive Electrode $Li_2CO_3$ and $CoCO_3$ were mixed together in a predetermined molar ratio, and this mixture was heated at 950° C. to synthesize $LiCoO_2$ serving as the positive electrode active material. The positive electrode active material was classified into 45 μm or less. 100 parts by weight of this positive electrode active material was mixed with 5 parts by weight of acetylene black serving as a conductive agent, 4 parts by weight of polyvinylidene fluoride serving as a binder, and a suitable amount of N-methyl-2-pyrrolidone serving as a dispersion medium, and the mixture was sufficiently kneaded to form a positive electrode mixture paste.

This positive electrode mixture paste was applied onto both sides of a current collector comprising a 15-μm-thick aluminum foil (available from Showa Denko K.K.), dried, and rolled. As a result, a positive electrode sheet comprising the current collector and a positive electrode mixture layer carried on each side thereof was obtained.

This positive electrode sheet was stored at room temperature in a dry atmosphere with a dew point of −60° C. or less, and it was dried in a vacuum at 80° C. to dehydrate the electrodes immediately before the assembly of a battery that will be described below.

(3) Assembly of Cylindrical Battery

The positive electrode sheet and the negative electrode sheet were cut into a predetermined size, to produce a cylindrical lithium-ion secondary battery as illustrated in FIG. 1.

One end of an aluminum positive electrode lead 14 was connected to a current collector of a positive electrode 11. One end of a nickel negative electrode lead 15 was connected to a current collector of a negative electrode 12. The positive electrode 11, the negative electrode 12, and a separator 13 isolating the two electrodes were spirally wound to fabricate an electrode assembly. The separator 13 is a 20-μm-thick microporous film made of polyethylene resin, which is wider than the positive and negative electrodes. The outer face of the electrode assembly was completely covered with the end part of the separator on the end of winding side. This electrode assembly was dried at 60° C. in a vacuum in a dry atmosphere of −60° C. for 10 hours, to evaporate the water content in the electrode assembly. The separator 13 and other battery members were fully dried in advance to minimize the water that would be included in the battery.

An upper insulating ring 16 and a lower insulating ring 17 were fitted on and under the electrode assembly, respectively, which was then placed in a battery can 18. Subsequently, a non-aqueous electrolyte was injected into the battery can to impregnate the electrode assembly. The other end of the positive electrode lead 14 was welded to a conductive member 21 in electrical continuity with a positive electrode terminal 20, which is fixed to a sealing plate 19 made of an electrically insulating resin. The other end of the negative electrode lead 15 was welded to the inner bottom face of the battery can 18. Lastly, the opening of the battery can 18 was closed with the sealing plate 19. In this way, a cylindrical lithium ion secondary battery was completed. This battery had a diameter of 18 mm, a length of 65 mm, and a design capacity of 2000 mAh.

Further, in this example, an electrode 22, serving as a reference electrode in measuring the potential of the negative electrode, was mounted in the central space of the electrode assembly. The electrode 22 comprises a Ni metal wire 23 (wire diameter 0.5 mm) around which a Li metal foil 24 (thickness 50 μm) is wrapped. The nickel wire 23 penetrates the conductive member 21 and the positive electrode terminal 20 and is electrically isolated from the conductive member 21 by an insulating film 25 covering the surface of the nickel wire. The positive electrode terminal 20 is insulated from the nickel wire 23 by a packing 26.

The non-aqueous electrolyte used was prepared by dissolving lithium hexafluorophosphate at a concentration of 1 mol/L in a non-aqueous solvent mixture of ethylene carbonate and diethyl carbonate in a volume ratio of 1:1. This non-aqueous electrolyte was measured quantitatively and qualitatively to determine its acid content and acid components. As a result, it was found that the main component was HF and the total amount was 18 ppm.

Using the negative electrode (i), negative electrode (ii), negative electrode (iii), and negative electrode (iv) with the given amounts of Li added thereto, batteries 1 to 6, batteries 7 to 12, batteries 13 to 18, and batteries "a" to "f" were produced, respectively. Table 1 shows the amounts of Li added to the negative electrodes of the respective batteries.

(4) Battery Evaluation

<i> Discharge Capacity

In a constant temperature oven set at 20° C., each of these batteries was charged at a constant current of 400 mA (0.2 C; 1 C is a 1 hour-rate current) until the battery voltage reached 4.05 V and then charged at a constant voltage of 4.05 V until the current value decreased to 20 mA (0.01 C). Thereafter, each battery was discharged at a constant current of 0.2 C until the battery voltage decreased to 2.0 V. Table 1 shows the discharge capacities.

<ii> Discharge Storage Test

After the measurement of the discharge capacities, the batteries were operated in a constant temperature oven set at 20° C. as follows. First, each battery was charged at a constant current of 0.2 C until the battery voltage reached 4.05 V and then charged at a constant voltage of 4.05 V until the current value reached 0.01 C. Subsequently, the battery was discharged at a current of 0.2 C until the battery voltage decreased to 2.0 V (end-of-discharge voltage). After 1 hour, the potential of the negative electrode was measured relative to the electrode 22. This potential is shown as "negative electrode potential during storage" in the following tables. Thereafter, each battery was stored in a constant temperature oven at 85° C. for 3 days. After this storage, it was charged and discharged once under the same conditions as the above, to obtain discharge capacity. In this way, the capacity recovery rate after storage ((discharge capacity after storage)×100/(discharge capacity before storage))(%) was obtained.

<iii> Cycle Life

After the measurement of the discharge capacities, the batteries were repeatedly charged and discharged in a constant temperature oven set at 20° C. as follows. First, each battery was charged at a constant current of 1 C until the battery voltage reached 4.05 V and then charged at a constant voltage of 4.05 V until the current value reached 0.05 C. Subsequently, it was discharged at a constant current of 1 C until the battery voltage decreased to 2.5 V. These operations were repeated. The percentage of the discharge capacity at the 100th cycle relative to discharge capacity at the 2nd cycle was defined as capacity retention rate (%). Table 1 shows the results. The closer to 100% the capacity retention rate becomes, the better the cycle life is.

TABLE 1

| | Negative electrode | Amount of Li added | Discharge capacity (mAh) | Negative electrode potential during storage (V vs Li/Li+) | Acid content of electrolyte (ppm) | Recovery rate (%) | Capacity retention rate after 100 cycles (%) |
|---|---|---|---|---|---|---|---|
| Battery 1 | Negative electrode (i) | Deposition thickness 6 μm | 1320 | 0.38 | 64 | 96 | 92 |
| Battery 2 | Negative electrode (i) | Deposition thickness 4 μm | 1780 | 0.59 | 63 | 95 | 91 |
| Battery 3 | Negative electrode (i) | Deposition thickness 3 μm | 1930 | 0.90 | 68 | 92 | 91 |
| Battery 4 | Negative electrode (i) | Deposition thickness 2 μm | 2010 | 1.18 | 71 | 89 | 86 |
| Battery 5 | Negative electrode (i) | Deposition thickness 1 μm | 2060 | 1.48 | 70 | 85 | 82 |
| Battery 6 | Negative electrode (i) | Not deposited | 2100 | 1.76 | 71 | 58 | 43 |
| Battery 7 | Negative electrode (ii) | Attached area 1/4 | 1290 | 0.40 | 85 | 97 | 95 |
| Battery 8 | Negative electrode (ii) | Attached area 1/6 | 1760 | 0.61 | 87 | 94 | 93 |
| Battery 9 | Negative electrode (ii) | Attached area 1/8 | 1900 | 0.88 | 90 | 93 | 92 |
| Battery 10 | Negative electrode (ii) | Attached area 1/10 | 1970 | 1.13 | 83 | 90 | 88 |
| Battery 11 | Negative electrode (ii) | Attached area 1/15 | 2030 | 1.50 | 91 | 83 | 78 |
| Battery 12 | Negative electrode (ii) | Not attached | 2060 | 1.69 | 89 | 63 | 33 |
| Battery 13 | Negative electrode (iii) | Attached area 1/2 | 1280 | 0.39 | 78 | 97 | 95 |
| Battery 14 | Negative electrode (iii) | Attached area 1/3 | 1750 | 0.61 | 79 | 94 | 94 |
| Battery 15 | Negative electrode (iii) | Attached area 1/4 | 1930 | 0.92 | 76 | 92 | 94 |
| Battery 16 | Negative electrode (iii) | Attached area 1/6 | 1990 | 1.08 | 75 | 89 | 89 |
| Battery 17 | Negative electrode (iii) | Attached area 1/8 | 1860 | 1.49 | 81 | 84 | 85 |
| Battery 18 | Negative electrode (iii) | Not attached | 1100 | 1.56 | 80 | 65 | 64 |
| Battery 19 | Graphite | Not added | 1250 | 0.31 | 90 | 99 | 95 |
| Battery a | Negative electrode (iv) | Deposition thickness 15 μm | 1450 | 0.41 | 65 | 98 | 96 |
| Battery b | Negative electrode (iv) | Deposition thickness 12 μm | 1860 | 0.73 | 70 | 99 | 96 |
| Battery c | Negative electrode (iv) | Deposition thickness 10 μm | 1960 | 0.98 | 71 | 99 | 98 |
| Battery d | Negative electrode (iv) | Deposition thickness 8 μm | 2050 | 1.10 | 73 | 99 | 99 |
| Battery e | Negative electrode (iv) | Deposition thickness 4 μm | 1860 | 1.45 | 74 | 98 | 87 |
| Battery f | Negative electrode (iv) | Not deposited | 1330 | 1.83 | 72 | 64 | 60 |

A comparative battery 19 in Table 1 was fabricated in the same manner as the battery 6, except for the use of a negative electrode that was prepared as follows. A mixture of 100 parts by weight of graphite and 6 parts by weight of a binder (polyacrylic acid) was mixed with water to form a paste, and this paste was applied onto a current collector, dried, and rolled, to produce the negative electrode.

As can be seen from Table 1, all the batteries using the negative electrodes of this example exhibited higher capacities than the comparative battery 19. However, the battery 1, battery 7, battery 13, battery "a", and battery "f" exhibited slightly higher capacities than the comparative battery 19, indicating that they do not make full use of the characteristics of the negative electrodes of the present invention. Further, the battery 18 exhibited a slightly lower capacity than the comparative battery 19, because the lithium of the positive electrode was consumed due to the irreversible capacity of the negative electrode. This also holds true for the battery "f". Also, with respect to the storage characteristics after discharge, it was observed that the battery 6, battery 12, battery 18, and battery "f" had particularly low recovery rates. When these batteries were carefully examined, it was found that the non-aqueous electrolyte contained a large amount of Si dissolved therein and that a coating film containing Si was formed on the negative electrode surface. Also, when other batteries were examined, it was found that the lower the negative electrode potential at the termination of discharge (negative electrode potential during storage in Table 1), the less the dissolution of Si in the non-aqueous electrolyte and that the amount of dissolution was below the detection limit particularly when the negative electrode potential was 0.9 V or less vs $Li/Li^+$.

In these batteries, the acid content of the non-aqueous electrolyte was 63 to 91 ppm. In the batteries 1 to 6 using the negative electrode (i), the acid content was 63 to 71 ppm, which was the least. In the batteries 7 to 12 using the negative electrode (ii), it was 83 to 91 ppm, which was relatively large. The reason is probably as follows. In the negative electrode (ii), polyacrylic acid was used as the binder, and it formed a hydrate in the electrode. A part of the hydrate did not evaporate during the drying at 190° C., and the water contained in the hydrate reacted with the $LiPF_6$ in the non-aqueous electrolyte to form hydrofluoric acid. In the negative electrode (iii), the acid content was 75 to 81 ppm. Table 1 shows these values.

Also, with respect to the capacity retention rate after 100 cycles, the battery 6, battery 12, and battery 18 were inferior to the other batteries. This is probably because with an increase in the charge/discharge cycles, repeated discharges cause the dissolution reaction of Si and the precipitation reaction of the dissolved Si to proceed, thereby impeding the charge/discharge reaction.

EXAMPLE 2

In this example, the acid content of the non-aqueous electrolyte was examined. Using the negative electrode of the battery 9, cylindrical lithium ion secondary batteries were produced in the same manner as in Example 1. Specifically, batteries 20 to 25 were produced by varying the drying condition of the negative electrode (ii) (vacuum drying at 190° C. for 12 hours) as shown in Table 2. Table 2 shows the detected acid contents of the electrolytes and battery characteristics.

TABLE 2

| | Negative electrode | Drying condition | Acid content of electrolyte (ppm) | Discharge capacity (mAh) | Negative electrode potential during storage (V vs Li/Li+) | Recovery rate (%) | Capacity retention rate after 100 cycles (%) |
|---|---|---|---|---|---|---|---|
| Battery 20 | Negative electrode (ii) | Stored at 20° C. in a dry atmosphere with a dew point of −60° C. or less for 24 hours | 231 | 1820 | 0.85 | 42 | 31 |
| Battery 21 | Negative electrode (ii) | Dried at 60° C. with hot air for 10 hours | 189 | 1880 | 0.89 | 70 | 66 |
| Battery 22 | Negative electrode (ii) | Dried at 190° C. with hot air for 10 hours | 145 | 1890 | 0.88 | 75 | 78 |
| Battery 23 | Negative electrode (ii) | Dried at 60° C. in a vacuum for 10 hours | 102 | 1910 | 0.91 | 82 | 81 |
| Battery 24 | Negative electrode (ii) | Dried at 190° C. in a vacuum for 12 hours | 56 | 1910 | 0.9 | 80 | 80 |
| Battery 25 | Negative electrode (ii) | Dried at 190° C. in a vacuum for 48 hours | 44 | 1820 | 0.88 | 81 | 61 |

As is clear from Table 2, even when the end-of-discharge potential of the negative electrode is 1.5 V or less vs $Li/Li^+$, if the acid content of the non-aqueous electrolyte is greater than 200 ppm, the recovery rate after storage in a discharged state and the capacity retention rate were low, as in the battery 20. This is probably because a large amount of hydrofluoric acid near the negative electrode tends to cause the reaction of the formula (I) to go on the right side, thereby promoting the dissolution reaction of Si and the film-forming reaction associated therewith.

The battery 25 exhibited a lower capacity retention rate after 100 cycles than the batteries 22 to 24. When the Si content in the non-aqueous electrolyte of the battery 25 was measured, it was found to be below the detection limit. Also, when the surface of the negative electrode active material was observed, the surface was found to be very flat and smooth.

On the other hand, in the case of the batteries 20 to 24, it was found that the surface of the negative electrode active material had minute projections and depressions and that these projections and depressions became larger with the increase in acid content. In the case of the batteries 20 to 22, in particular, there were deep depressions. This indicates that the dissolution of a large amount of Si locally occurred.

The surface of the negative electrode active material of the battery 25 was subjected to an X-ray photoelectron spectroscopy (XPS), and binding energy attributable to $SiO_2$ was detected. This result shows that when the acid content is small, the $SiO_2$ on the outermost surface cannot be dissolved. Further, since the reaction area of the negative electrode active material is small, the electrochemical reaction does not proceed smoothly. Probably for this reason, the cycle characteristics (i.e., the characteristics obtained when electrochemical reactions are repeated) of the battery 25 degraded.

EXAMPLE 3

In this example, the effect of impurities contained in the negative electrode was examined. The negative electrode active material used in this example was prepared in the same manner as in the negative electrode (ii), except that the balls used in mechanical alloying were made of S45C steel (Fe-0.45% C steel) instead of stainless steel and that the operation time was increased to 80 hours, 100 hours, or 150 hours. The resultant alloys had a wide particle size distribution of 0.5 μm to 80 μm. By classifying them with a sieve (10 μm under), alloy materials with a maximum particle size of 8 μm and a mean particle size of 5 μm were obtained. These alloy powders thus obtained were named alloy "b", alloy "c", and alloy "d".

These alloys "b" to "d" were subjected to an ICP spectrometry to examine impurities, and it was found that the transition metal elements other than Fe were below the detection limit. The amount of Fe was 680 ppm in the alloy "b", 980 ppm in the alloy "c", and 1320 ppm in the alloy "d".

The alloys "b" to "d" were subjected to an X-ray diffraction analysis, and their XRD profiles were similar to that of the alloy "a". All of these alloys were microcrystalline, and the crystal grain (crystallite) size calculated from the half width of the most intense peak by Scherrer formula was 11 to 18 nm. It was presumed that the particles of the alloy "b" to "d" had a Si single phase (A phase) and a $TiSi_2$ phase (B phase). Also, these alloys were observed with a transmission electron microscope (TEM), and it was found that they had an amorphous region, the Si single phase including crystal grains (crystallites) with a size of approximately 10 nm, and the $TiSi_2$ phase including crystal grains (crystallites) with a size of approximately 10 to 20 nm.

Using these alloys, a negative electrode mixture layer was formed on each side of a current collector sheet in the same manner as in the negative electrode (ii), and a Li foil was attached to the surfaces of the negative electrode mixture layers so as to cover ⅛ of the negative electrode area.

Using these negative electrodes, cylindrical lithium ion secondary batteries 26 to 28 were produced in the same manner as the battery 9 and evaluated in the same manner as the foregoing Examples. Table 3 shows the results and the acid contents detected from the batteries.

TABLE 3

| | Negative electrode active material | Amount of impurity (ppm) | Discharge capacity (mAh) | Negative electrode potential during storage (V vs Li/Li$^+$) | Acid content of electrolyte (ppm) | Recovery rate (%) | Capacity retention rate after 100 cycles (%) |
|---|---|---|---|---|---|---|---|
| Battery 26 | Alloy b | 680 | 1890 | 0.88 | 81 | 91 | 90 |
| Battery 27 | Alloy c | 980 | 1870 | 0.85 | 83 | 73 | 83 |
| Battery 28 | Alloy d | 1320 | 1870 | 0.91 | 85 | 32 | 55 |

These results indicate that when the amount of impurities exceeds 1000 ppm, the recovery rate after storage in a discharged state and the capacity retention rate become low.

EXAMPLE 4

Batteries 29, 30, and 31 were produced in the same manner as the batteries 3, 9, and 15, respectively, except for the use of a non-aqueous electrolyte containing 3% by weight of lithium bis[1,2-oxyalate(2-)-O,O']borate (hereinafter referred to as LiBOB). Also, batteries 32, 33, and 34 were produced in the same manner except for the use of a non-aqueous electrolyte containing 5% by weight of LiBOB. Further, battery 35, 36, and 37 were produced in the same manner except for the use of a non-aqueous electrolyte containing 8% by weight of LiBOB. These batteries were evaluated in the same manner as in the foregoing Examples. Table 4 shows the results and the acid contents detected from the batteries.

TABLE 4

| | Negative electrode | Amount of LiBOB added (wt %) | Discharge capacity (mAh) | Negative electrode potential during storage (V vs Li/Li+) | Acid content of electrolyte (ppm) | Recovery rate (%) | Capacity retention rate after 100 cycles (%) |
|---|---|---|---|---|---|---|---|
| Battery 29 | Negative electrode (i) | 3 | 1950 | 0.85 | 75 | 94 | 95 |
| Battery 30 | Negative electrode (ii) | 3 | 1930 | 0.86 | 77 | 96 | 96 |
| Battery 31 | Negative electrode (iii) | 3 | 1940 | 0.89 | 79 | 95 | 97 |
| Battery 32 | Negative electrode (i) | 5 | 1930 | 0.91 | 80 | 95 | 91 |
| Battery 33 | Negative electrode (ii) | 5 | 1910 | 0.94 | 79 | 97 | 92 |
| Battery 34 | Negative electrode (iii) | 5 | 1910 | 0.92 | 80 | 96 | 94 |
| Battery 35 | Negative electrode (i) | 8 | 1860 | 0.90 | 83 | 94 | 85 |
| Battery 36 | Negative electrode (ii) | 8 | 1830 | 0.89 | 83 | 95 | 81 |
| Battery 37 | Negative electrode (iii) | 8 | 1810 | 0.88 | 85 | 95 | 83 |

These results demonstrated that the addition of LiBOB to a non-aqueous electrolyte at a concentration of not higher than 5% by weight improves the recovery rate after storage in a discharged state and the capacity retention rate after charge/discharge cycles. This is probably because the LiBOB captures hydrofluoric acid and suppresses its action, thereby suppressing the dissolution of Si and resulting in improvement in battery characteristics. When the amount of LiBOB added exceeds 5% by weight, the capacity retention rate after charge/discharge cycles tended to lower. This is probably because the excessive LiBOB heightens the viscosity of the non-aqueous electrolyte, thereby hampering the movement of the lithium ions. These results indicate that the upper limit of the amount of LiBOB is desirably 5% by weight.

The negative electrode for non-aqueous electrolyte secondary batteries according to the present invention can provide a non-aqueous electrolyte secondary battery having both a high capacity and good charge/discharge cycle characteristics. The present invention is applicable to various non-aqueous electrolyte secondary batteries. For example, the present invention is applicable to batteries of not only a cylindrical shape as in Examples but also coin, prismatic, and flat shapes, with an electrode assembly structure such as a wound or layered type. The non-aqueous electrolyte secondary battery according to the present invention is useful as the main power source for mobile communications appliances, portable electronic appliances, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
    a positive electrode capable of electrochemically absorbing and desorbing Li;
    a negative electrode; and
    a non-aqueous electrolyte,
    wherein said negative electrode comprises an oxide being represented by the formula $SiO_x$ where $0<x<2$ and having a $SiO_2$ layer on a surface thereof, as a negative electrode active material and has a vapor-deposited Li film formed on a surface thereof before battery assembling to add Li in an amount corresponding to the irreversible capacity, the thickness of said vapor-deposited Li film being 8 to 12 μm,
    said non-aqueous electrolyte comprises lithium hexafluorophosphate as a main supporting electrolyte and has an acid content of not less than 50 ppm and not more than 200 ppm, and
    said negative electrode has a potential of not less than 0.6 V and not more than 1.5 V relative to a Li electrode at an end-of-discharge voltage of said battery.

2. The non-aqueous electrolyte secondary battery in accordance with claim 1, wherein said non-aqueous electrolyte contains not more than 5% by weight of bis[1,2-oxalate(2-)-O,O']borate ion.

3. The non-aqueous electrolyte secondary battery in accordance with claim 1, wherein said negative electrode comprises a negative electrode current collector and a thin film of said negative electrode active material that is deposited on said negative electrode current collector.

* * * * *